(12) United States Patent
Hu

(10) Patent No.: US 9,828,750 B2
(45) Date of Patent: Nov. 28, 2017

(54) TEMPORARY STOP WATER OUTPUT DEVICE

(71) Applicant: Xiamen Runner Industrial Corporation, Xiamen (CN)

(72) Inventor: XinZhan Hu, Xiamen (CN)

(73) Assignee: XIAMEN RUNNER INDUSTRIAL CORPORATION, Xiamen (CN)

( * ) Notice: Subject to any disclaimer, the term of this patent is extended or adjusted under 35 U.S.C. 154(b) by 29 days.

(21) Appl. No.: 15/097,934

(22) Filed: Apr. 13, 2016

(65) Prior Publication Data

US 2016/0305099 A1   Oct. 20, 2016

(30) Foreign Application Priority Data

Apr. 18, 2015  (CN) .................... 2015 2 0238043 U

(51) Int. Cl.
*E03C 1/04* (2006.01)
*F16K 3/26* (2006.01)
*E03C 1/02* (2006.01)

(52) U.S. Cl.
CPC ............ *E03C 1/0408* (2013.01); *F16K 3/265* (2013.01); *E03C 2001/026* (2013.01)

(58) Field of Classification Search
CPC ... E03C 1/0408; E03C 2001/026; F16K 3/265
USPC ................ 251/319, 320, 325, 341, 343–344, 251/347–348; 137/625.35, 325.38
See application file for complete search history.

(56) References Cited

U.S. PATENT DOCUMENTS

| 4,194,534 A * | 3/1980 | Lawrence .................. B66B 1/24 137/596.16 |
| 4,933,569 A * | 6/1990 | Merchlewitz ........... B05B 1/304 251/282 |
| 5,097,863 A * | 3/1992 | McCann .............. G05D 7/0126 137/504 |
| 8,561,632 B2 * | 10/2013 | Bayer ..................... C21C 5/462 137/219 |
| 2011/0180741 A1 * | 7/2011 | Lockhart ............... E03C 1/0408 251/324 |

FOREIGN PATENT DOCUMENTS

GB          2022778 A  * 12/1979  ............ F16K 3/265

* cited by examiner

*Primary Examiner* — Marina Tietjen
(74) *Attorney, Agent, or Firm* — Chun-Ming Shih

(57) ABSTRACT

A temporary stop water output device includes a main body, which is hollow in shape, and has one end provided with a water output port; a movable core axis, which is hollow in shape and is disposed in the main body, and has one end connected to the water output port; a connector fixing piece, which is of a cap shape, and on which is provided with a water channel, and which is located on a trajectory at other end of the movable core axis, while its inner wall is connected movably to other end of the movable core axis; and a connector, connected to inside other end of the main body through the connector fixing piece. The temporary stop water output device is simple in construction, easy to operate, in achieving good water temporary stoppage effect, and satisfying user demand in application.

1 Claim, 3 Drawing Sheets

TEMPORARY STOP WATER OUTPUT DEVICE

BACKGROUND OF THE INVENTION

Field of the Invention

The present invention relates to a water output device, and in particular to a temporary stop water output device used in shower equipment.

The Prior Arts

Usually, in using faucet water, sometimes it is required to stop using water temporarily, and then resume using water right after. However, presently, this is realized through a control switch not disposed on the water output equipment itself, and that could cause quite inconvenience.

Therefore, presently, the design and performance of the water output device is not quite satisfactory, and it leaves much room for improvement.

SUMMARY OF THE INVENTION

In view of the problems and drawbacks of the prior art, the present invention provides a temporary stop water output device, to overcome the shortcomings of the prior art.

In order to achieve the objective mentioned above, the present invention provides a temporary stop water output device, including: a main body, a movable core axis, a connector fixing piece, and a connector. Wherein, the main body is hollow in shape, and has one end provided with a water output port. The movable core axis is hollow in shape and is disposed in the main body, and has one end connected to the water output port. The connector fixing piece is of a cap shape, on which is provided with a water channel, and is located on a trajectory at the other end of the movable core axis, while its inner wall is connected movably to other end of the movable core axis. And the connector is connected to inside the other end of the main body through the connector fixing piece.

In an aspect of the present invention, the present invention further includes a push button, disposed to penetrate through the main body, and is connected to a lower portion at water output side of the movable core axis.

In another aspect of the present invention, the present invention further includes a seal piece, disposed each between the movable core axis and the connector fixing piece, and between the movable core axis and an inner wall of the main body at a side of the water output port.

Compared with the Prior Art, the present invention has the advantages that, it is novel in design, simple in construction, easy to operate, in achieving good water temporary stoppage effect, and satisfying user demand in application.

Further scope of the applicability of the present invention will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from the detailed descriptions.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
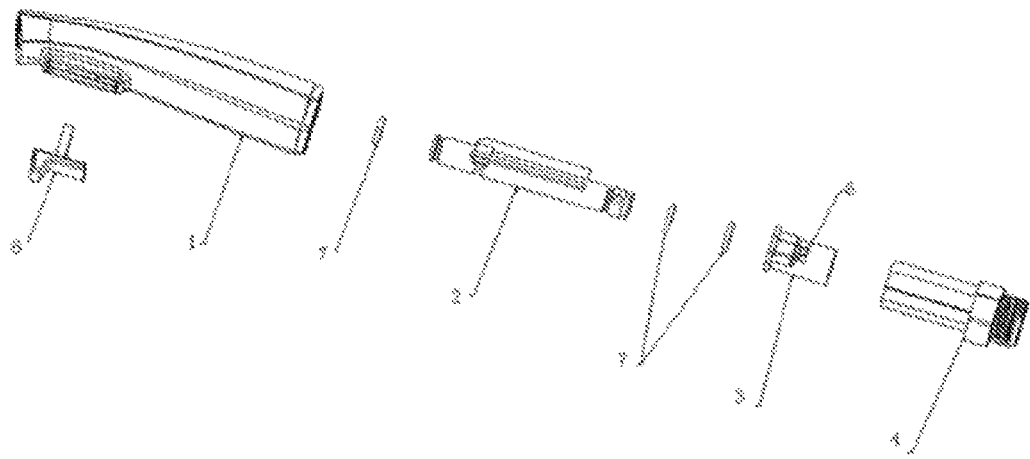
FIG. 1 is an exploded view of a temporary stop water output device according to an embodiment of the present invention.
Figure 2:
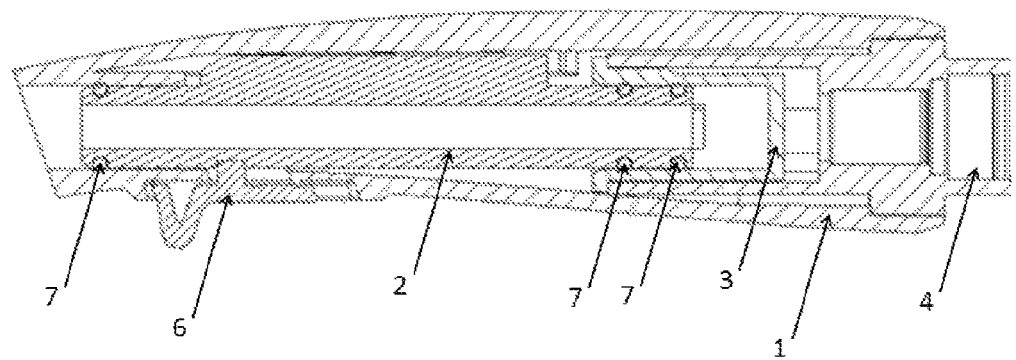
FIG. 2 is a top cross section view of a temporary stop water output device while outputting water according to an embodiment of the present invention.
Figure 3:
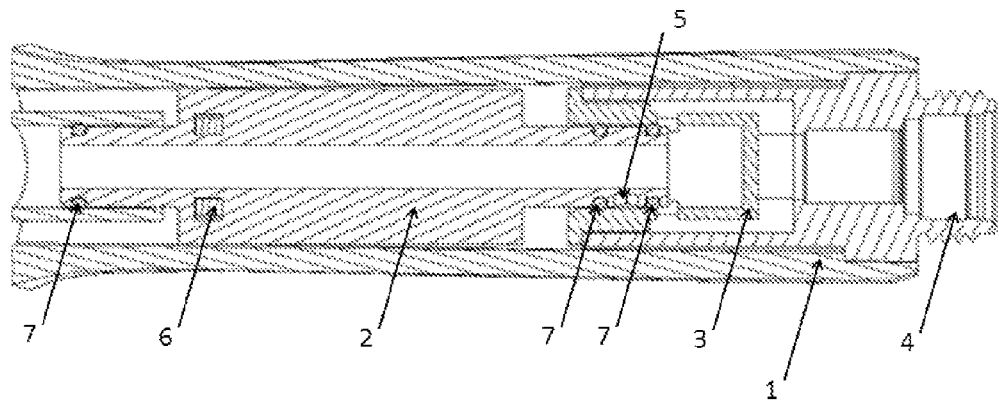
FIG. 3 is a side cross section view of a temporary stop water output device while outputting water according to an embodiment of the present invention.
Figure 4:
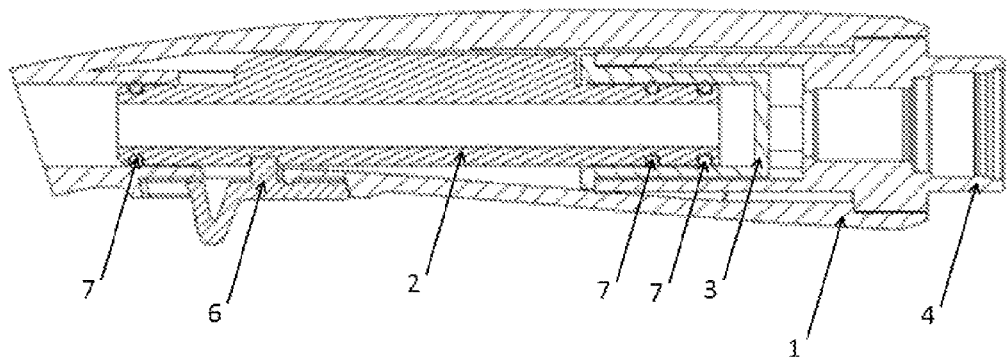
FIG. 4 is a top cross section view of a temporary stop water output device while temporarily stopping outputting water according to an embodiment of the present invention.
Figure 5:
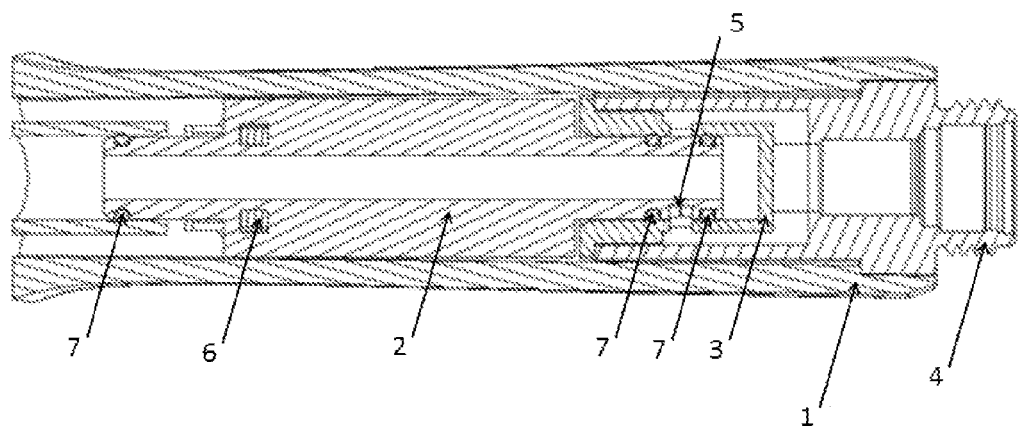
FIG. 5 is a side cross section view of a temporary stop water output device while temporarily stopping outputting water according to an embodiment of the present invention.

Refer to FIGS. 1 to 5 respectively for an exploded view of a temporary stop water output device according to an embodiment of the present invention; a top cross section view of a temporary stop water output device while outputting water according to an embodiment of the present invention; a side cross section view of a temporary stop water output device while outputting water according to an embodiment of the present invention; a top cross section view of a temporary stop water output device while temporarily stopping outputting water according to an embodiment of the present invention; and a side cross section view of a temporary stop water output device while temporarily stopping outputting water according to an embodiment of the present invention.

As shown in FIGS. 1 to 5, the present invention provides a temporary stop water output device, including: a main body 1, a movable core axis 2, a connector fixing piece 3, and a connector 4. Wherein, the main body 1 is hollow in shape, and has one end provided with a water output port. The movable core axis 2 is hollow in shape and is disposed in the main body 1, and has one end connected to the water output port. The connector fixing piece 3 is of a cap shape, on which is provided with a water channel 5, and is located on a trajectory at the other end of the movable core axis 2, while its inner wall is connected movably to other end of the movable core axis 2. And the connector 4 is connected to inside the other end of the main body 1 through the connector fixing piece 3.

In an embodiment of the present invention, the present invention further includes a push button 6, disposed to penetrate through the main body 1, and is connected to a lower portion at water output side of the movable core axis 2.

In an embodiment of the present invention, the present invention further includes a seal piece 7, disposed each between the movable core axis 2 and the connector fixing piece 3, and between the movable core axis 2 and an inner wall of the main body 1 at a side of the water output port.

The implementation of the present invention is described as follows. When it is desired to stop water output, all it has to do is to push the push button 6 in the direction to the connector 4, to make the other end of the movable core axis 2 pass the position of the water channel 5, so that water flowed in from the connector 4 is not allowed to pass through inside the connector fixing piece 3 to flow into the hollow inside of the movable core axis 2, as such stopping temporarily water output from the water output port. Alternatively, when it is desired to output water from the water output port, all it has to do is to push the push button 6 in the direction away from the connector 4, to make the other end of the movable core axis 2 not passing the position of the water channel 5, so that water flowed in from the connector 4 is allowed to pass through inside the connector fixing piece 3 to flow into the hollow inside of the movable core axis 2, in realizing water output from the water output port.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:
1. A temporary stop water output device, comprising:
   a main body, which is hollow in shape, and has one end provided with a water output port;
   a movable core member, which is hollow in shape and is disposed in the main body, and has one end connected to the water output port, wherein a first water channel is integrally formed on the movable core member;
   a connector fixing piece, which is of a cap shape, and on which is provided with a second water channel, and which is located on a trajectory at the other end of the movable core member, while its inner wall is connected movably to other end of the movable core member, wherein the first water channel is capable of being aligned with the second water channel;
   a connector, connected to inside the other end of the main body;
   at least one first seal piece disposed between the movable core member and the connector fixing piece;
   a second seal piece disposed between the movable core member and an inner wall of the main body at a side of the water output port; and
   a push button disposed between the at least first seal piece and the second seal piece.

* * * * *